United States Patent
Oyabu et al.

(10) Patent No.: US 8,553,345 B2
(45) Date of Patent: Oct. 8, 2013

(54) POSITION DEMODULATION APPARATUS AND POSITION DEMODULATION METHOD

(75) Inventors: Hiroshi Oyabu, Tokyo (JP); Tatsuhiko Kosugi, Tokyo (JP); Kazuhiko Takaishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 13/365,098

(22) Filed: Feb. 2, 2012

(65) Prior Publication Data
US 2012/0314321 A1    Dec. 13, 2012

(30) Foreign Application Priority Data
Jun. 10, 2011    (JP) .................. 2011-130590

(51) Int. Cl.
*G11B 5/02*    (2006.01)
*G11B 5/596*    (2006.01)

(52) U.S. Cl.
USPC ........................................ 360/29; 360/77.08

(58) Field of Classification Search
USPC .............. 360/29, 39, 75, 77.08, 77.02, 77.07, 360/78.04, 78.07, 78.14
See application file for complete search history.

(56) References Cited

U.S. PATENT DOCUMENTS

| | | | | |
|---|---|---|---|---|
| 4,970,602 | A * | 11/1990 | Yoshio | ............................ 386/207 |
| 6,989,956 | B2 | 1/2006 | Takaishi et al. | |
| 2008/0068740 | A1 | 3/2008 | Kouhara et al. | |
| 2010/0073807 | A1 | 3/2010 | Kosugi | |
| 2011/0063751 | A1 | 3/2011 | Yasuna et al. | |

FOREIGN PATENT DOCUMENTS

| | | |
|---|---|---|
| JP | 09-016264 | 1/1997 |
| JP | 2004-039116 | 2/2004 |
| JP | 2008-071438 | 3/2008 |
| JP | 2010-049742 | 3/2010 |
| WO | WO-2008/139603 | 11/2008 |

OTHER PUBLICATIONS

Japanese Office Action dated Sep. 4, 2012, filed in Japanese counterpart Application No. 2011-130590, 6 pages (including translation).

* cited by examiner

*Primary Examiner* — Nabil Hindi
(74) *Attorney, Agent, or Firm* — Patterson & Sheridan, LLP

(57) ABSTRACT

According to one embodiment, a position demodulation method includes demodulating a first demodulation signal and a second demodulation signal having a phase difference of 90 degrees to the first demodulation signal based on a read-out signal obtained by reading out a servo pattern recorded on a medium by the head for positioning of a head with respect to the medium; correcting the first and second demodulation signals in which, when a trace of a Lissajous figure is drawn representing the first and second demodulation signals as values on coordinate axes different from each other on a plane, a ratio of respective lengths between intersections of the trace intersecting with two axes orthogonal at an origin of the plane is kept constant; and demodulating a positional signal for determining a position of the head based on the first and second demodulation signals after being corrected at the correcting.

13 Claims, 17 Drawing Sheets

TRACK

US 8,553,345 B2

POSITION DEMODULATION APPARATUS AND POSITION DEMODULATION METHOD

CROSS-REFERENCE TO RELATED APPLICATIONS

This application is based upon and claims the benefit of priority from Japanese Patent Application No. 2011-130590, filed Jun. 10, 2011, the entire contents of which are incorporated herein by reference.

FIELD

Embodiments described herein relate generally to a position demodulation apparatus and a position demodulation method.

BACKGROUND

Storage devices write data or the like to a recording medium using an actuator arm with a head provided to the tip of the actuator arm. The recording medium has data areas to store user data and servo areas to store data used for positioning control of the head.

In such a storage device, when the head passes over a servo area, the position of the head is determined based on a signal read out from the servo area. The arm adjusts the head position based on the position determined. Thus, the head can be controlled to be located at a desired position.

There are several types of patterns recorded in the servo areas including, for example, null servo patterns, area servo patterns, and phase servo patterns. The use of these servo patterns recorded in the servo areas allows determining the position of the head.

However, in a storage device, it is difficult to determine the position of the head simply based on positional information read out from a servo pattern. This is because it is difficult to associate the signal read out with the position of the head in a smooth correspondence relation due to moving of the head, for example. Therefore, in a storage device, a correction process is required for the signal read out to determine the position of the head more accurately.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a position demodulation apparatus comprises a demodulator, a correcting module, and a position demodulator. The demodulator is configured to demodulate a first demodulation signal and a second demodulation signal having a phase difference of 90 degrees to the first demodulation signal based on a read-out signal obtained by reading out a servo pattern recorded on a medium by the head for positioning of a head with respect to the medium. The correcting module is configured to perform on the first demodulation signal and the second demodulation signal a correction in which, when a trace of a Lissajous figure is drawn representing the first demodulation signal and the second demodulation signal as values on coordinate axes different from each other on a plane, a ratio of respective lengths between intersections of the trace intersecting with two axes orthogonal at an origin of the plane is kept constant. The position demodulator is configured to demodulate a positional signal for determining a position of the head based on the first demodulation signal and the second demodulation signal after being corrected by the correcting module.

First Embodiment

Figure 1:
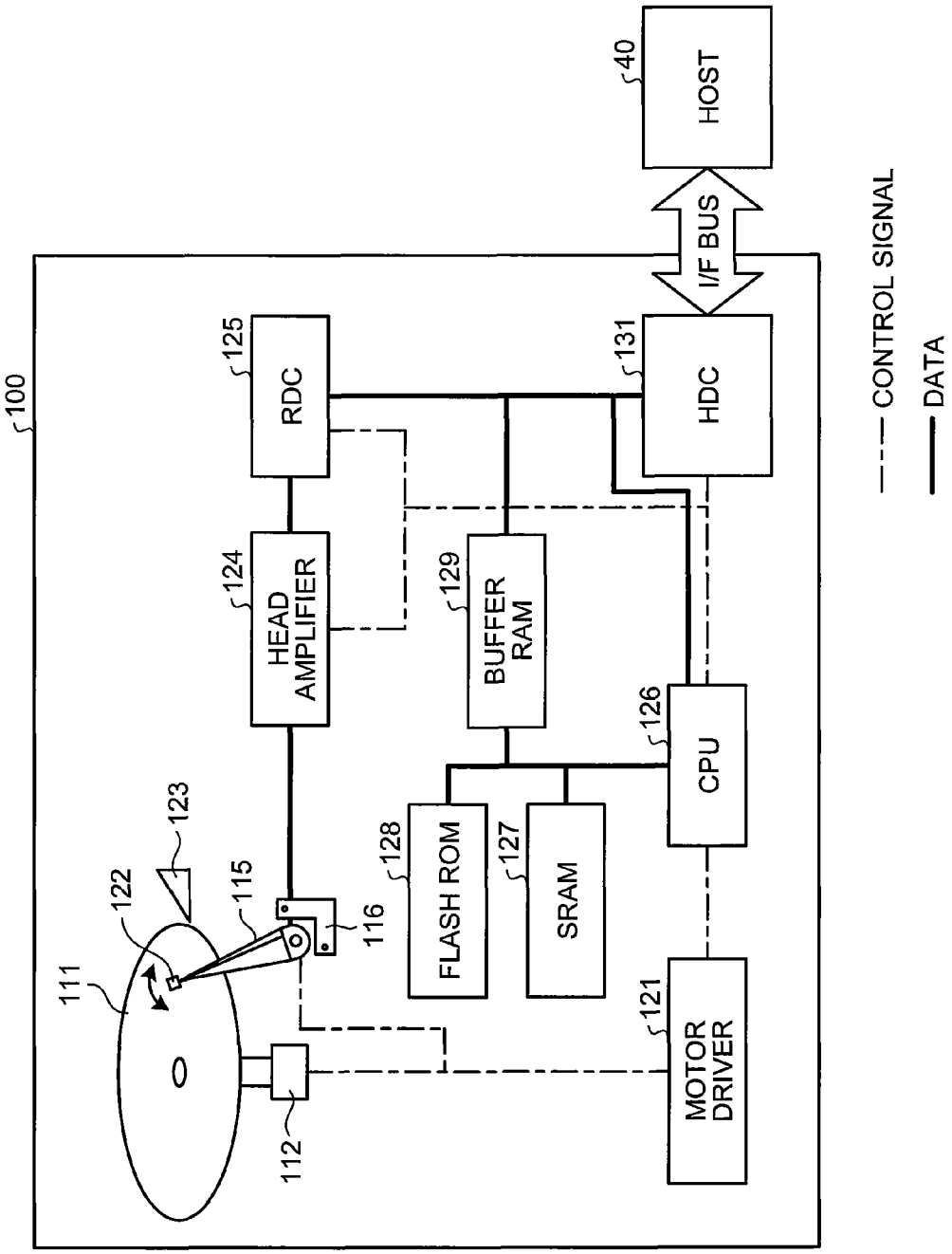
FIG. 1 is an exemplary block diagram schematically illustrating an electrical hardware configuration of a disk storage device according to a first embodiment.

A disk storage device to which a position demodulation apparatus and a position demodulation method according to a first embodiment are applied will first be described. FIG. 1 is a schematic block diagram illustrating an electrical hardware configuration of a disk storage device 100 in the first embodiment.

In FIG. 1, a magnetic disk 111 is a disk-shaped recording medium, and is rotated by a spindle motor 112 about the rotation axis at a predetermined rotational speed. The spindle motor 112 is rotated by a motor driver 121.

A magnetic head 122 writes data to and reads data from the magnetic disk 111 by a recording head and a reproducing head provided therewith, respectively. The magnetic head 122 is located at the tip of an actuator arm 115, and is moved in the radial direction of the magnetic disk 111 by a voice coil motor (VCM) 116 driven by the motor driver 121. When the rotation of the magnetic disk 111 is stopped and the like, the magnetic head 122 is retracted on a ramp 123.

A head amplifier 124 amplifies a signal read out by the magnetic head 122 from the magnetic disk 111, and outputs the signal to feed it to a read-write channel (RDC) 125. The head amplifier 124 further amplifies a signal supplied from the RDC 125 for writing data to the magnetic disk 111, and feeds the amplified signal to the magnetic head 122.

The RDC 125 carries out code modulation on data supplied from a hard disk controller (HDC) 131, which will be described later, to be written to the magnetic disk 111, and feeds it to the head amplifier 124. The RDC 125 further carries out code demodulation on a signal read out from the magnetic disk 111 and fed from the head amplifier 124, and outputs it to the HDC 131 as digital data.

A CPU 126 is connected with a static random access memory (SRAM) 127 that is a working memory, a flash read only memory (ROM) 128 that is a non-volatile memory, and a buffer RAM 129 for temporary storage. The CPU 126 controls the overall operation of the disk storage device 100 in accordance with firmware stored in advance in the flash ROM 128 and the magnetic disk 111.

The HDC 131 controls data exchange with a host computer (host) 40 via an I/F bus, controls the buffer RAM 129, corrects errors in recorded data, and the like. The buffer RAM 129 is used as a cache for the data sent and received with the host computer 40.

The detail of the magnetic disk 111 will be explained. The magnetic disk 111 has a data area where user data is recorded and a servo area where servo information and the like is recorded. In the servo area, servo patterns extending in circular arcs in a radial direction from the rotation center are recorded. The servo pattern is the data used for positioning the magnetic head 122.

The magnetic disk 111 is a recording medium comprising a substrate made of metal or glass in a disk shape and a magnetic film formed thereon. To record data onto the magnetic disk 111, a magnetic field is applied from the magnetic head 122 to a recording area where data is recorded on the magnetic disk 111 to make a magnetized state of magnetic materials on the surface thereof changed, thereby recording the data. To read out and reproduce data from the magnetic disk 111, the magnetic head 122 is moved to a recorded area of intended reproduction on the magnetic disk 111 and the magnetized state of magnetic materials of the magnetic disk 111 is read out to reproduce the data. The recording method of the magnetic disk 111 may be either of perpendicular magnetic recording method or horizontal magnetic recording method.

In the embodiment, as a method for determining the position of the magnetic head 122, null demodulation, i.e., demodulation with a null servo pattern, is used. A servo pattern in the servo area is configured to have a preamble section, a servo mark (SM) section, a Gray code section, and a burst section. The preamble section is defined as an area in which a preamble signal for performing clock synchronization is recorded. The burst section that corresponds to a leading portion of the servo pattern is an area used for detecting an offset position of the magnetic head 122 from a track center in each track. When null demodulation is used, the burst section has a block in two phases (hereinafter, referred to as a null pattern).

Figure 2:
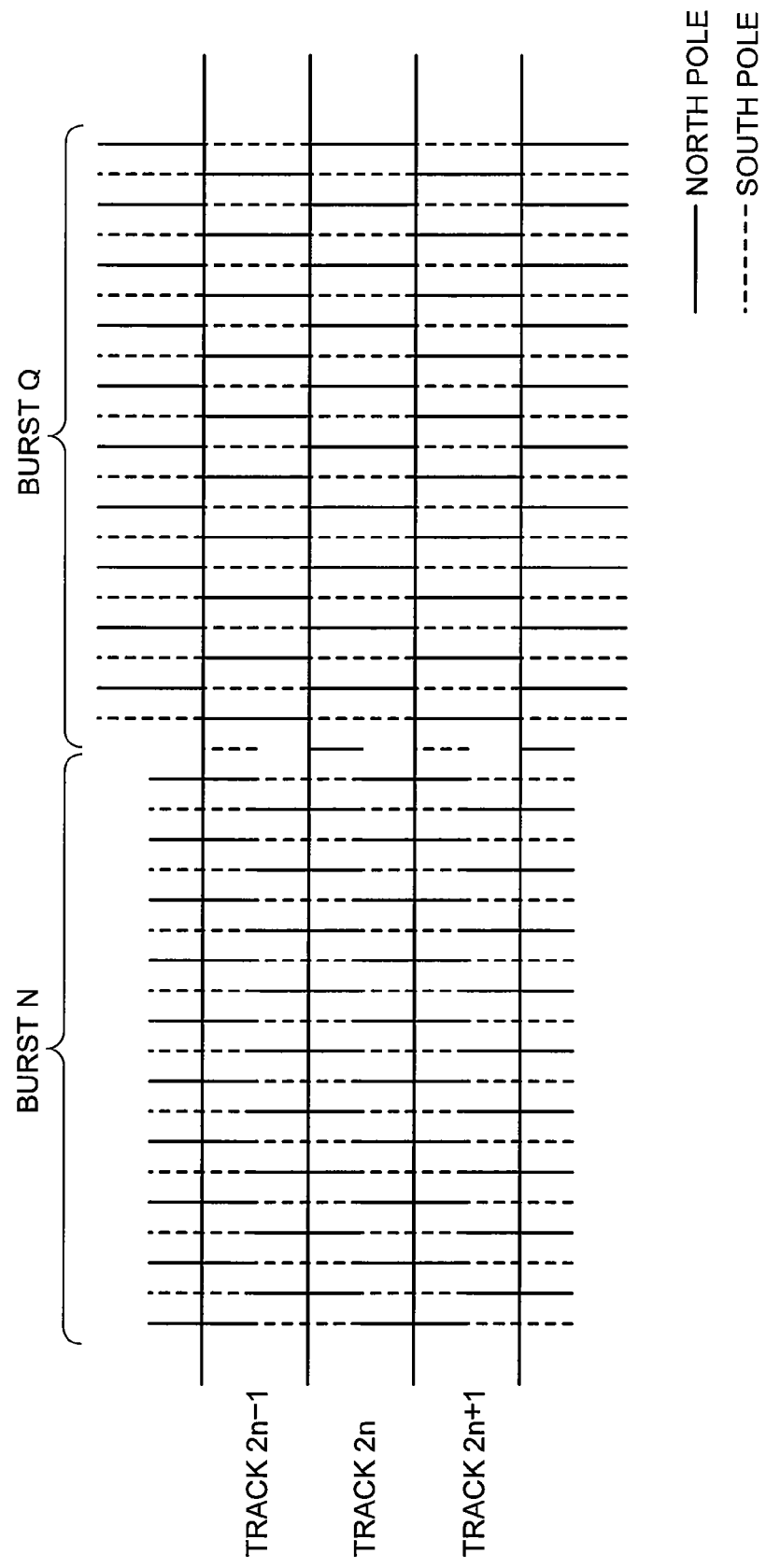
FIG. 2 is an exemplary diagram illustrating an example of a pattern in a burst section of a magnetic disk when null demodulation is used in the first embodiment.

The burst section of the magnetic disk 111 will be described specifically. FIG. 2 illustrates an example of a pattern in a burst section of the magnetic disk 111 in the case of null demodulation. As illustrated in FIG. 2, a null pattern in two phases is formed in the burst section. As illustrated in FIG. 2, the null pattern is arranged with north poles and south poles alternately. Accordingly, accessing a null pattern by a read core of the magnetic head 122 allows reading out a signal of the waveform of which changes in a cycle and which is formed by those north poles and south poles.

In the present embodiment, as the null pattern in two phases, a burst N for a positional information signal PosN and a burst Q for a positional information signal PosQ that is shifted in phase by 90 degrees from the positional information signal PosN are recorded. More specifically, as illustrated in FIG. 2, the patterns are shifted from each other by half a track in a radial direction between the burst N and the burst Q (because the burst N and the burst Q are formed by repeated patterns in a cycle of two tracks and the patterns of the burst N and the burst Q are shifted by half a track from each other in the radial direction, and thus hereinafter, also referred to as being phase shifted by 90 degrees or having a phase difference of 90 degrees). Because of this, the amplitude of waveforms is configured to be different between a signal read out from the burst N by the magnetic head 122 and a signal read out from the burst Q. Therefore, in the disk storage device 100 in the present embodiment, by the difference in amplitude of signal waveforms of the burst N and the burst Q, an offset position (hereinafter, also referred to as a position) of the read core of the magnetic head 122 can be determined.

In the disk storage device 100 in the present embodiment, a correction is performed on demodulation signals obtained from discrete Fourier transform (DFT) operation on a positional information signal PosN and a positional information signal PosQ recorded in a burst section, and from the demodulation signals after the correction, a positional signal (a signal that allows determining an offset position) of the magnetic head 122 from the track center of a track number detected is demodulated.

Figure 3:
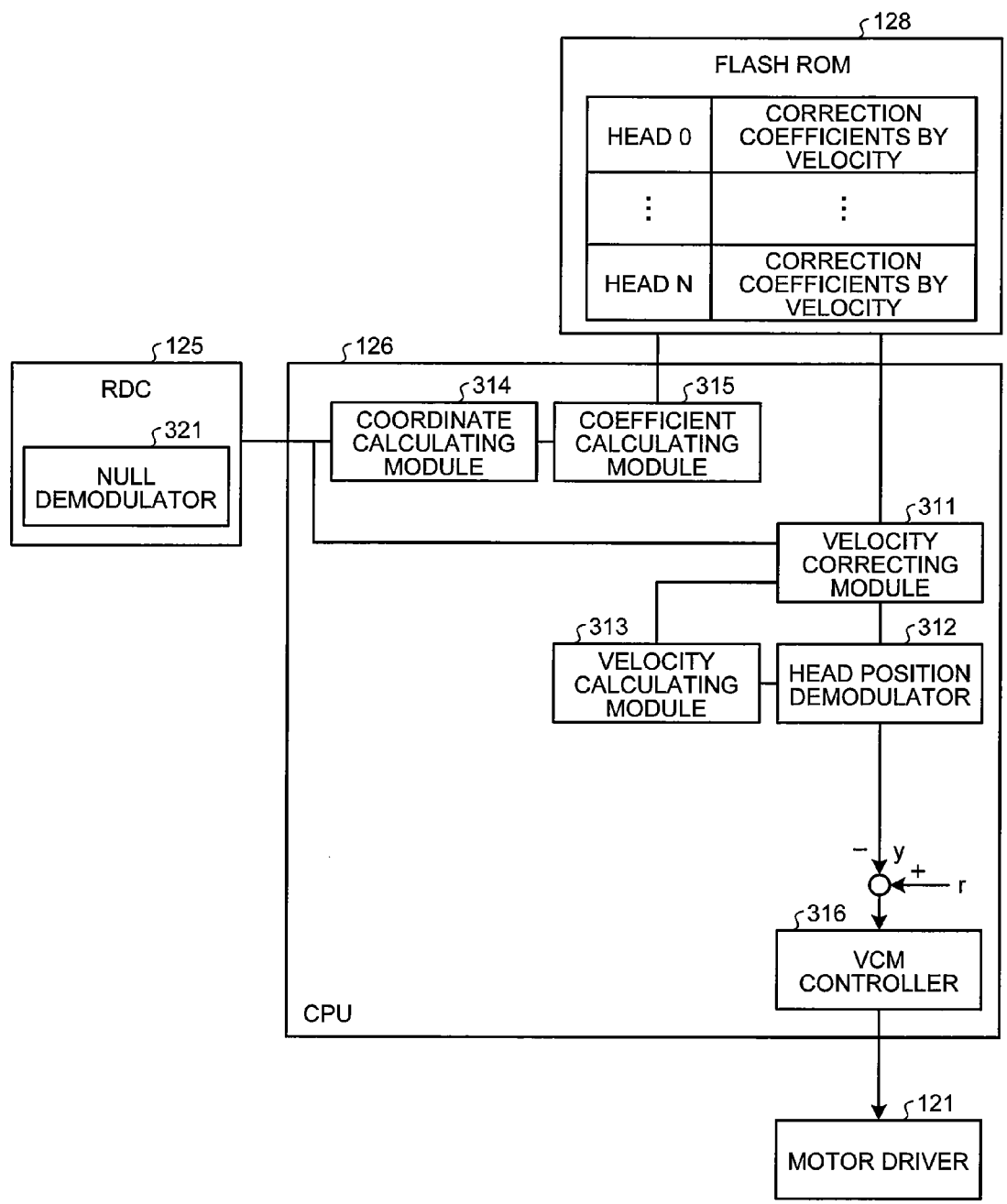
FIG. 3 is an exemplary block diagram illustrating a configuration to perform demodulation of a position in an RDC and a CPU in the first embodiment.

A configuration to demodulate position will be described. FIG. 3 is a block diagram illustrating a configuration to perform demodulation of a position in the RDC 125 and the CPU 126.

The RDC 125 comprises a null demodulator 321. The null demodulator 321 performs a discrete Fourier transform (DFT) operation on positional information signals PosN and PosQ that are signals of a null servo pattern recorded in the servo area of the magnetic disk 111 read out by the magnetic head 122. The null demodulator 321 then demodulates, as a result of the DFT operation, a demodulation signal N (a first demodulation signal) and a demodulation signal Q (a second demodulation signal). The demodulation signal N and the demodulation signal Q have a phase difference of 90 degrees from each other. The demodulation signal N and the demodulation signal Q obtained by demodulation are represented as respective vectors, each containing a sine component and a cosine component.

The disk storage device 100 can obtain a phase angle $\theta$ from a direction of a vector represented on a phase plane by using a sine component of the demodulation signal N as an X-coordinate and a sine component of the demodulation signal Q as a Y-coordinate. In the disk storage device 100, an offset position of the magnetic head 122 can be determined based on the phase angle $\theta$. The sine component of the demodulation signal N and the sine component of the demodulation signal Q used for determining the offset position will be explained.

Figure 4:
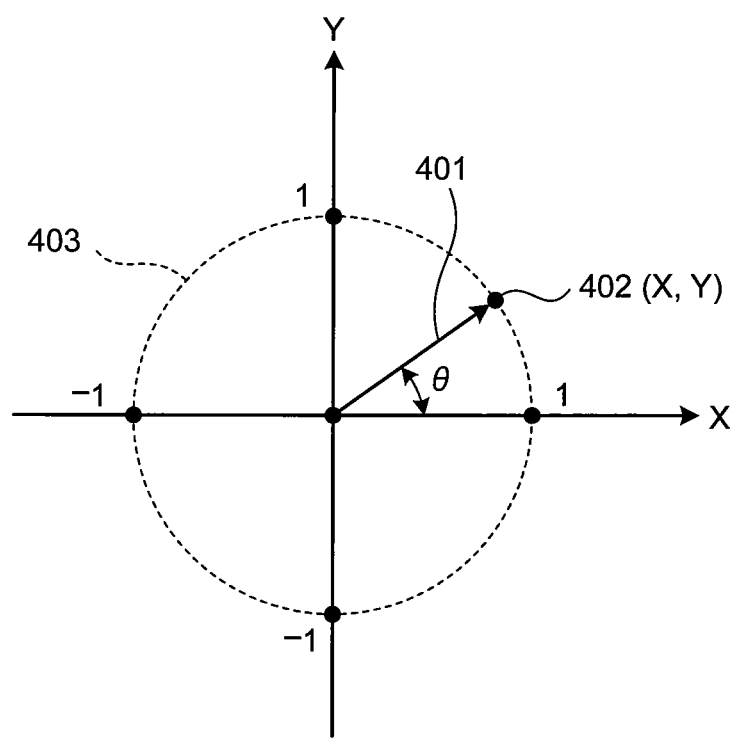
FIG. 4 is an exemplary chart illustrating a vector represented in a phase space after a sine component of a demodulation signal N is assigned on an X-coordinate and a sine component of a demodulation signal Q is assigned on a Y-coordinate.

FIG. 4 is a diagram illustrating a vector represented in a phase space after assigning a sine component of the demodulation signal N on an X-coordinate and a sine component of the demodulation signal Q on a Y-coordinate. In the phase space illustrated in FIG. 4, plotting a pair of a sine component of the demodulation signal N and a sine component of the demodulation signal Q sampled at a given timing in the phase space provides a coordinate representing a terminal 402 of a vector 401. The extracting timing of samples is conceivable, for example, to be performed at eight samples per $2\pi$ for six cycles ($12\pi$).

The vector 401 rotates in a counter-clockwise direction on a circle indicated by a broken line along with changes made when the magnetic head 122 is moved in the radial direction at a constant speed. The circumference of a circle 403 that the terminal 402 of the vector 401 draws holds samples of sine components of the demodulation signal N and sine components of the demodulation signal Q obtained by the move of the magnetic head 122 in the radial direction. Thus, plotting the results of samples held in a phase space provides a Lissajous figure. In the present embodiment, the Lissajous figure for determining the position of the core of the magnetic head 122 is referred to as a position Lissajous figure.

As for a demodulation method using the demodulation signals N and Q, varieties of methods have been proposed. However, these proposed methods are designed to obtain an accurate position of the magnetic head when the moving velocity of the magnetic head is at zero. Therefore, with these methods, the accurate position cannot be demodulated when the moving velocity of the magnetic head is not at zero. Accordingly, in the present embodiment, the demodulation of an accurate position is realized by performing a correction based on the moving velocity of the magnetic head 122.

Referring back to FIG. 3, the CPU 126 comprises a velocity correcting module 311, a head position demodulator 312, a velocity calculating module 313, a coordinate calculating module 314, a coefficient calculating module 315, and a VCM controller 316. The velocity correcting module 311, the head position demodulator 312, and the velocity calculating module 313 are used for the demodulation of the head position using a correction coefficient. The coordinate calculating module 314 and the coefficient calculating module 315 are used for calculation of the correction coefficient.

In the present embodiment, the concept of correction performed in the velocity correcting module 311 in the CPU 126 will be described with reference to position Lissajous figures. The position Lissajous figures in the followings are exemplified for the purpose of making the explanation easy, and thus it is not necessary to actually generate a position Lissajous figure when performing the correction of the demodulation signals N and Q in the disk storage device 100.

Figure 5:
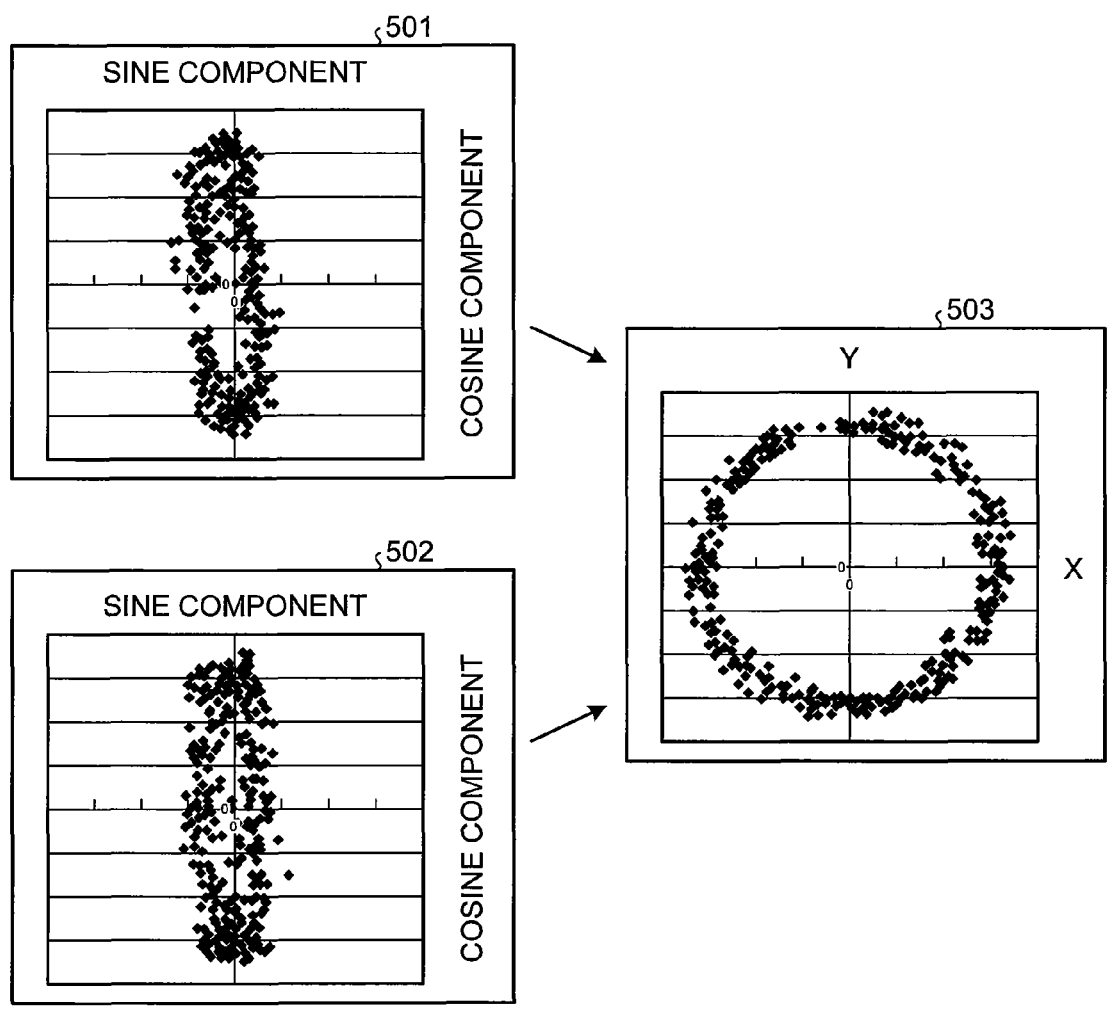
FIG. 5 is a group of exemplary charts illustrating a concept of a position Lissajous figure obtainable by the demodulation signals N and Q.

FIG. 5 is a group of charts illustrating the concept of a position Lissajous figure represented by the demodulation signals N and Q. As illustrated in FIG. 5, when sampled on a phase plane using sine components and cosine components of the demodulation signal N, a Lissajous figure as illustrated in a chart 501 is obtained. When sampled on a phase plane using sine components and cosine components of the demodulation signal Q, a Lissajous figure as illustrated in a chart 502 is obtained.

In the disk storage device 100 in the present embodiment, a position Lissajous figure is drawn using a plurality of pairs of a sine component of the demodulation signal N and a sine component of the demodulation signal Q. Specifically, as illustrated in chart 503 in FIG. 5, sine components of the demodulation signal N are assigned as values of an X-coordinate and sine components of the demodulation signal Q are assigned as values of a Y-coordinate. By the terminal of the vector generated by the assignment, a trace of a position Lissajous figure can be drawn on a phase plane.

However, the trace of a position Lissajous figure actually drawn has various distortions caused corresponding to environment. For example, when the magnetic head 122 is moving at a given velocity, a distortion is caused corresponding to the moving velocity. Therefore, the velocity correcting module 311 in the present embodiment performs a correction of the demodulation signal N and the demodulation signal Q so as to suppress the distortion caused in the position Lissajous figure corresponding to the moving velocity of the magnetic head 122.

Figure 6:
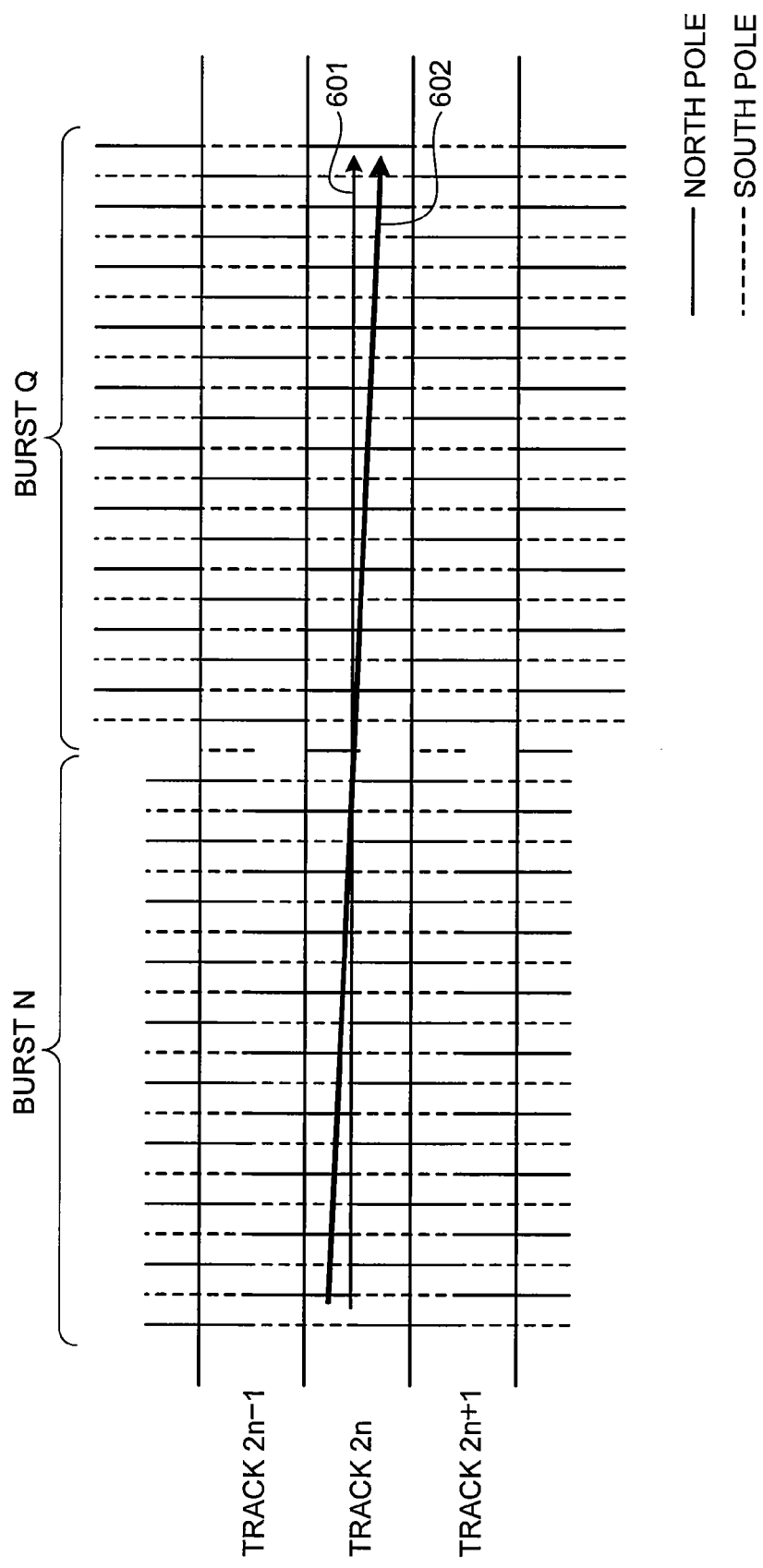
FIG. 6 is an exemplary diagram illustrating traces of a magnetic head with respect to a servo pattern on the magnetic disk in the first embodiment.

FIG. 6 is a diagram illustrating traces of the magnetic head 122 with respect to a servo pattern on the magnetic disk 111. In the example in FIG. 6, illustrated are a trace 601 of when the magnetic head 122 does not have a moving velocity in a radial direction (in other words, a direction to move to a different track) of the magnetic disk 111, and a trace 602 of when the magnetic head 122 has a moving velocity in the radial direction of the magnetic disk 111. In the present embodiment, the moving direction of the magnetic head 122 from a track $2n$ to a track $2n+1$ is defined as a positive direction, and the moving direction from the track $2n$ to a track $2n-1$ is defined as a negative direction.

Figure 7:
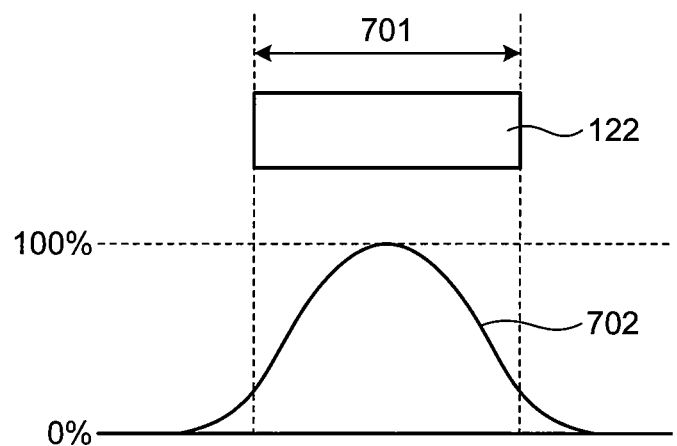
FIG. 7 is an exemplary chart illustrating detection sensitivity of the magnetic head in the first embodiment.

FIG. 7 is a chart illustrating detection sensitivity of the magnetic head 122 in the present embodiment. As illustrated in FIG. 7, in the present embodiment, the detection sensitivity draws a curve 702 with respect to a core width 701 of the magnetic head 122. In the curve 702, the detection sensitivity is 100% at a central portion and the detection sensitivity is lowered as moving away from the central portion.

Figure 8:
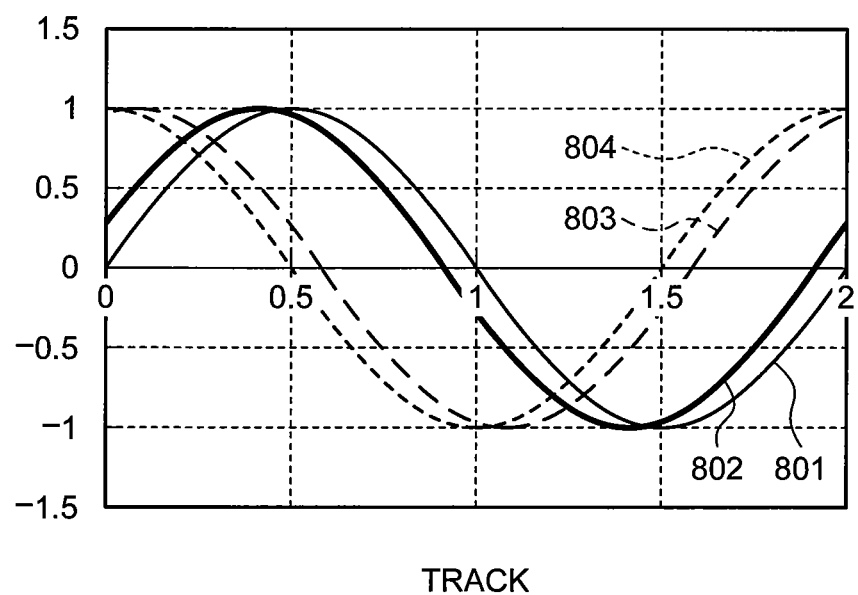
FIG. 8 is an exemplary chart depicting traces of the demodulation signal N and the demodulation signal Q when the magnetic head has and does not have a moving velocity in the first embodiment.

FIG. 8 is a chart depicting traces of the demodulation signal N and the demodulation signal Q when the magnetic head 122 has a detection sensitivity as illustrated in FIG. 7, and when the magnetic head 122 has and does not have a moving velocity. A track 1 in FIG. 8 corresponds to the center of the track 2n in FIG. 6. A track 0 and a track 2 with an offset track of one track correspond to the track centers of the track 2n−1 and the track 2n+1 in FIG. 6, respectively. A trace 801 represents the trace of the demodulation signal N when the magnetic head 122 does not have a moving velocity. A trace 804 represents the trace of the demodulation signal Q when the magnetic head 122 does not have a moving velocity.

When the magnetic head 122 has a moving velocity in the positive direction, the demodulation signal N draws a trace 802 and the demodulation signal Q draws a trace 803. As illustrated in FIG. 8, the demodulation signal N and the demodulation signal Q change in phase when the magnetic head 122 has a moving velocity. As illustrated in FIG. 8, when the magnetic head 122 has a moving velocity in the positive direction, the demodulation signal N and the demodulation signal Q change in phase such that a width between the traces of the demodulation signal N and the demodulation signal Q becomes narrower. In contrast, although it is not illustrated in FIG. 8, when the magnetic head 122 has a moving velocity in the negative direction, the demodulation signal N and the demodulation signal Q change in phase such that the width between the traces of the demodulation signal N and the demodulation signal Q becomes wider. The greater the moving velocity is, the wider the width of the change in phase becomes.

Figure 9:
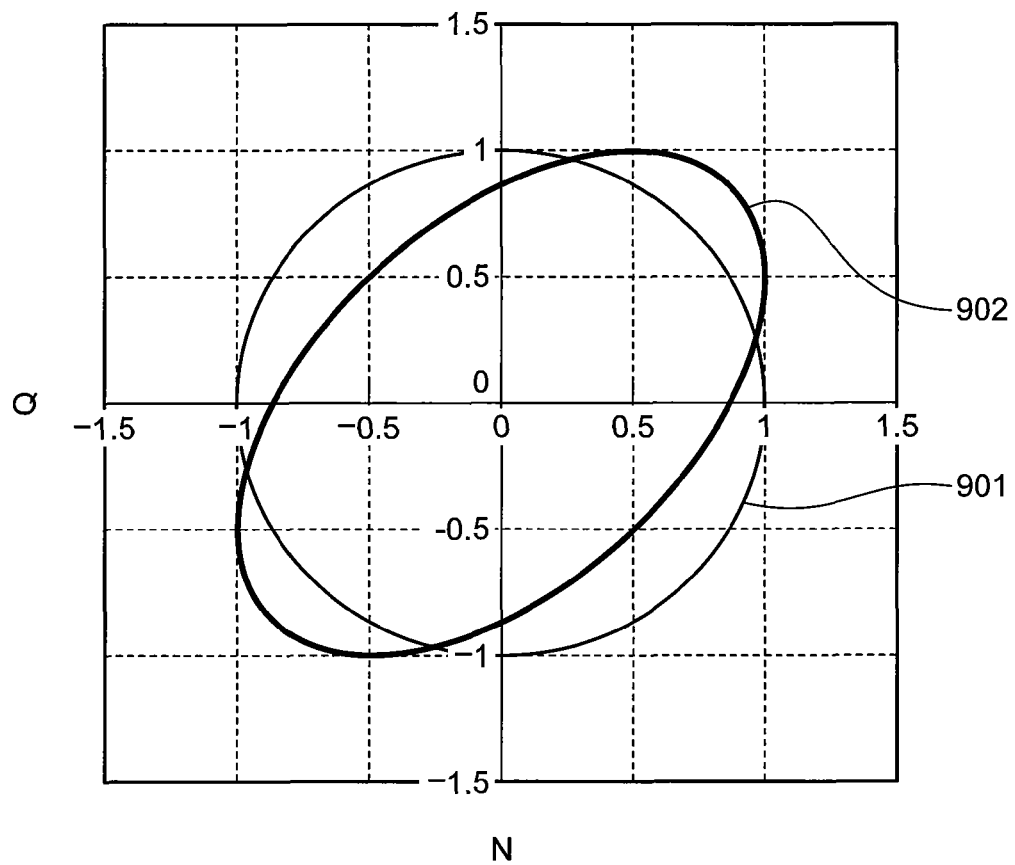
FIG. 9 is an exemplary chart for explaining position Lissajous figures depicted when the magnetic head has and does not have a moving velocity in the first embodiment.

FIG. 9 is a chart for explaining position Lissajous figures drawn when the magnetic head 122 has and does not have a moving velocity. As illustrated in FIG. 9, when the magnetic head 122 does not have a moving velocity, a position Lissajous figure is drawn as a waveform 901 close to a circle.

On the other hand, when the magnetic head 122 has a moving velocity, as illustrated in FIG. 8, a phase difference arises between the demodulation signal N and the demodulation signal Q. Therefore, a position Lissajous figure is drawn as a waveform 902 that is depressed in an elliptical shape corresponding to the moving velocity in a direction of an axis rotated by +45 degrees or by −45 degrees from a coordinate axis with reference to an origin. Furthermore, position Lissajous figures drawn differ by the moving direction and the moving velocity of the magnetic head 122. The differences in position Lissajous figures based on the differences in the moving direction and in the moving velocity will be described.

Figure 10:
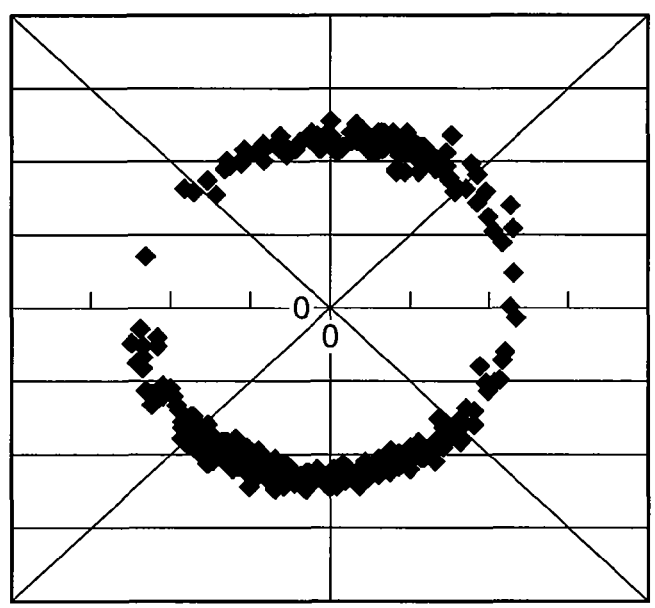
FIG. 10 is an exemplary chart illustrating an example of a position Lissajous figure drawn when the magnetic head does not have a moving velocity in the first embodiment.

FIG. 10 is a chart illustrating an example of a position Lissajous figure drawn when the magnetic head 122 does not have a moving velocity. As illustrated in FIG. 10, when the magnetic head 122 does not have a moving velocity, a circle with no distortion in any direction is drawn.

Figure 11:
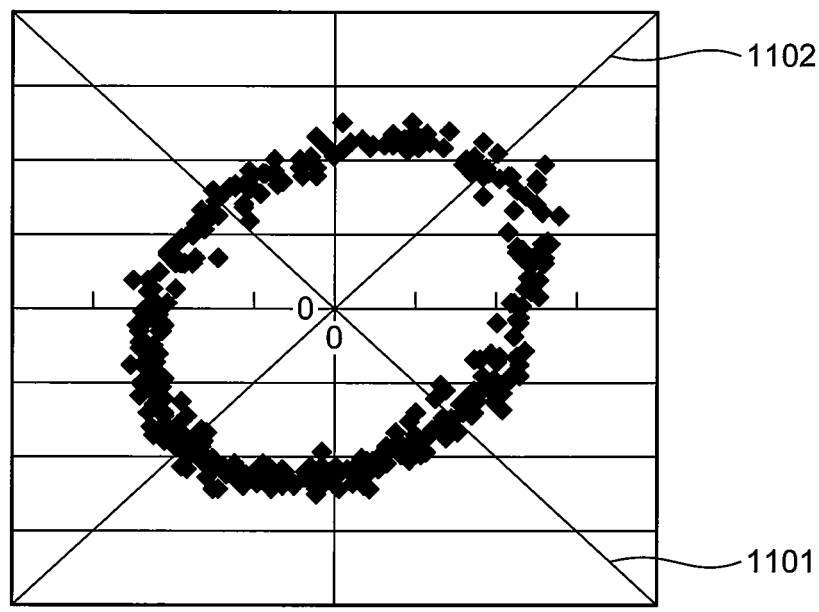
FIG. 11 is an exemplary chart illustrating an example of a position Lissajous figure drawn when the magnetic head moves in the positive direction at a moving velocity of V1 in the first embodiment.

FIG. 11 is a chart illustrating an example of a position Lissajous figure drawn when the magnetic head 122 moves in the positive direction at a moving velocity V1. The moving velocity V1 is assumed to be a relatively small moving velocity. As illustrated in FIG. 11, the position Lissajous figure is drawn as depressed in a direction to be closer towards an origin on an axis 1101 that is an X-coordinate axis rotated by 45 degrees in the clockwise direction centered on the origin. Furthermore, as illustrated in FIG. 11, an axis of symmetry 1102 comes to a +45 degree direction when the magnetic head 122 moves in the positive direction.

Figure 12:
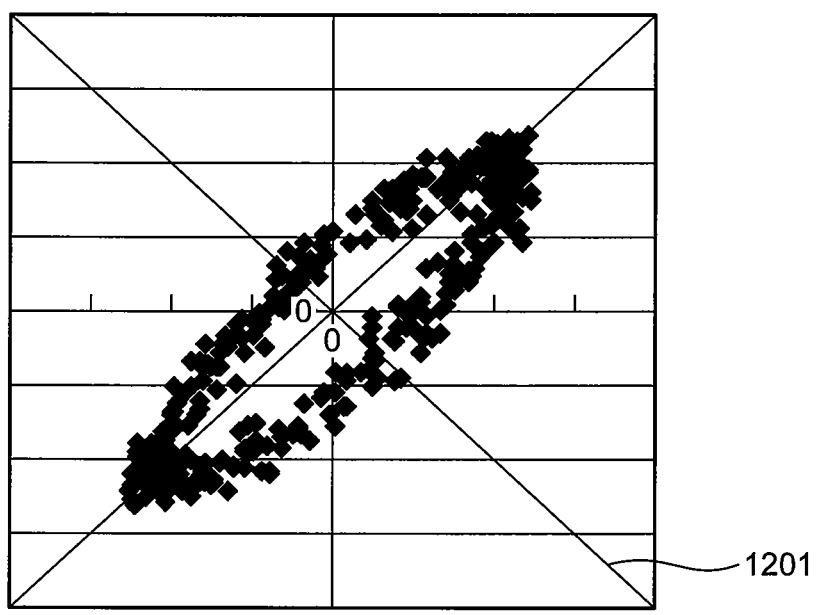
FIG. 12 is an exemplary chart illustrating an example of a position Lissajous figure drawn when the magnetic head moves in the positive direction at a moving velocity of V2 in the first embodiment.

FIG. 12 is a chart illustrating an example of a position Lissajous figure drawn when the magnetic head 122 moves in the positive direction at a moving velocity V2. The moving velocity V2 is assumed to be a relatively large moving velocity and in relation of moving velocity V2>moving velocity V1. The position Lissajous figure depicted in FIG. 12 is drawn as a further depressed figure, compared with the position Lissajous figure drawn in FIG. 11, in a direction to be closer towards an origin on an axis 1201. Accordingly, the faster the moving velocity of the magnetic head 122 becomes, the further depressed the position Lissajous figure is drawn.

Figure 13:
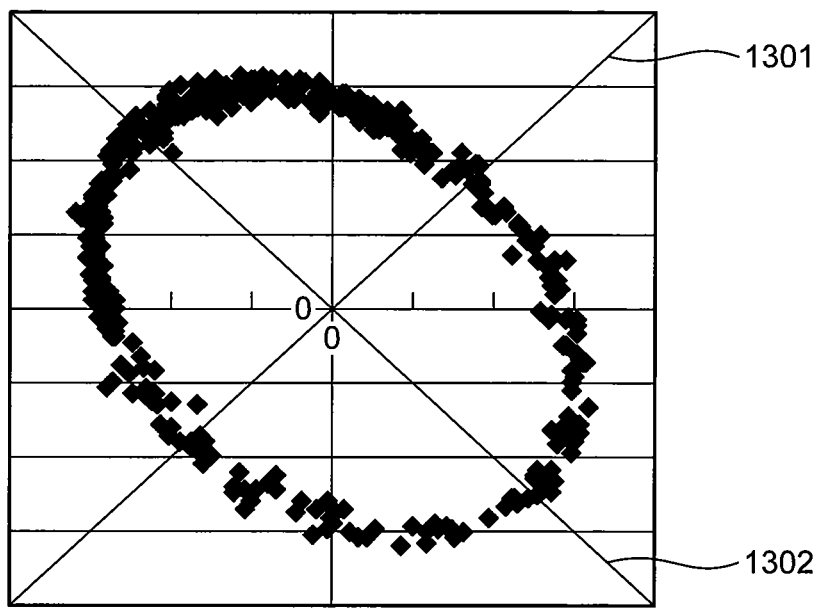
FIG. 13 is an exemplary chart illustrating an example of a position Lissajous figure drawn when the magnetic head moves in the negative direction at the moving velocity of V1 in the first embodiment.

FIG. 13 is a chart illustrating an example of a position Lissajous figure drawn when the magnetic head 122 moves in the negative direction at the moving velocity V1. As illustrated in FIG. 13, drawn is the position Lissajous figure depressed in a direction to be closer towards an origin on an axis 1301 that is an X-coordinate axis rotated by 45 degrees in the positive direction on a Y-coordinate centered on the origin. Furthermore, as illustrated in FIG. 13, the axis of symmetry 1302 comes to a −45 degree direction when the magnetic head 122 moves in the positive direction.

Figure 14:
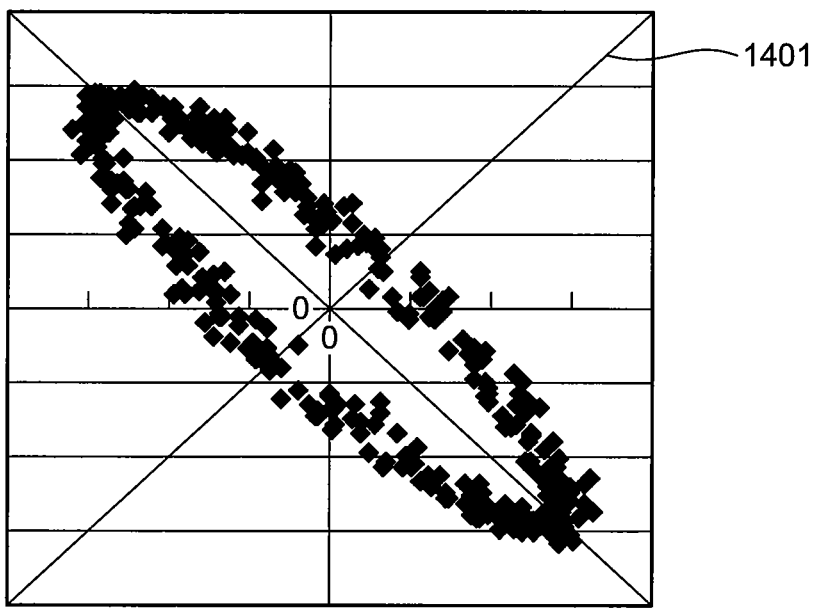
FIG. 14 is an exemplary chart illustrating an example of a position Lissajous figure drawn when the magnetic head moves in the negative direction at the moving velocity of V2 in the first embodiment.

FIG. 14 is a chart illustrating an example of a position Lissajous figure drawn when the magnetic head 122 moves in the negative direction at the moving velocity V2. The position Lissajous figure depicted in FIG. 12 is drawn as a further depressed figure, compared with the position Lissajous figure drawn in FIG. 13, in a direction to be closer towards an origin on an axis 1401. Accordingly, the faster the moving velocity of the magnetic head 122 becomes, the further depressed the position Lissajous figure is drawn.

As illustrated in FIGS. 11 to 14, the Lissajous figures are further depressed as the moving velocity of the magnetic head 122 becomes faster, and the axis of symmetry comes to +45 degrees when the moving velocity is in the positive direction and the axis of symmetry comes to −45 degrees when the moving velocity is in the negative direction. Accordingly, the axis of symmetry changes by 90 degrees corresponding to the moving direction of the magnetic head 122.

Consequently, under the condition where a depressed position Lissajous figure is drawn, the determining accuracy of the position of the magnetic head 122 is deteriorated. Therefore, in the velocity correcting module 311 of the disk storage device 100 in the present embodiment, making use of such characteristics, a position demodulation error by moving velocity is corrected on the demodulation signals N and Q.

Returning to FIG. 3, in the velocity correcting module 311, a correction of vector components is performed on the demodulation signal N and the demodulation signal Q in which, when the above-described trace of a position Lissajous figure is drawn on a phase plane where the demodulation signal N and the demodulation signal Q are assigned to values on respective coordinate axes different from each other on the phase plane (in the present embodiment, the demodulation signal N to a value on an X-coordinate and the demodulation signal Q to a value on a Y-coordinate), a ratio of lengths between intersections of the trace intersecting with two axes that are orthogonal at an origin of the phase plane is made one to one. In the present embodiment, the two orthogonal axes are defined as a first axis that is a coordinate axis rotated by 45 degrees with reference to the origin on the phase plane and a second axis that is orthogonal to the first axis at the origin.

Figure 15:
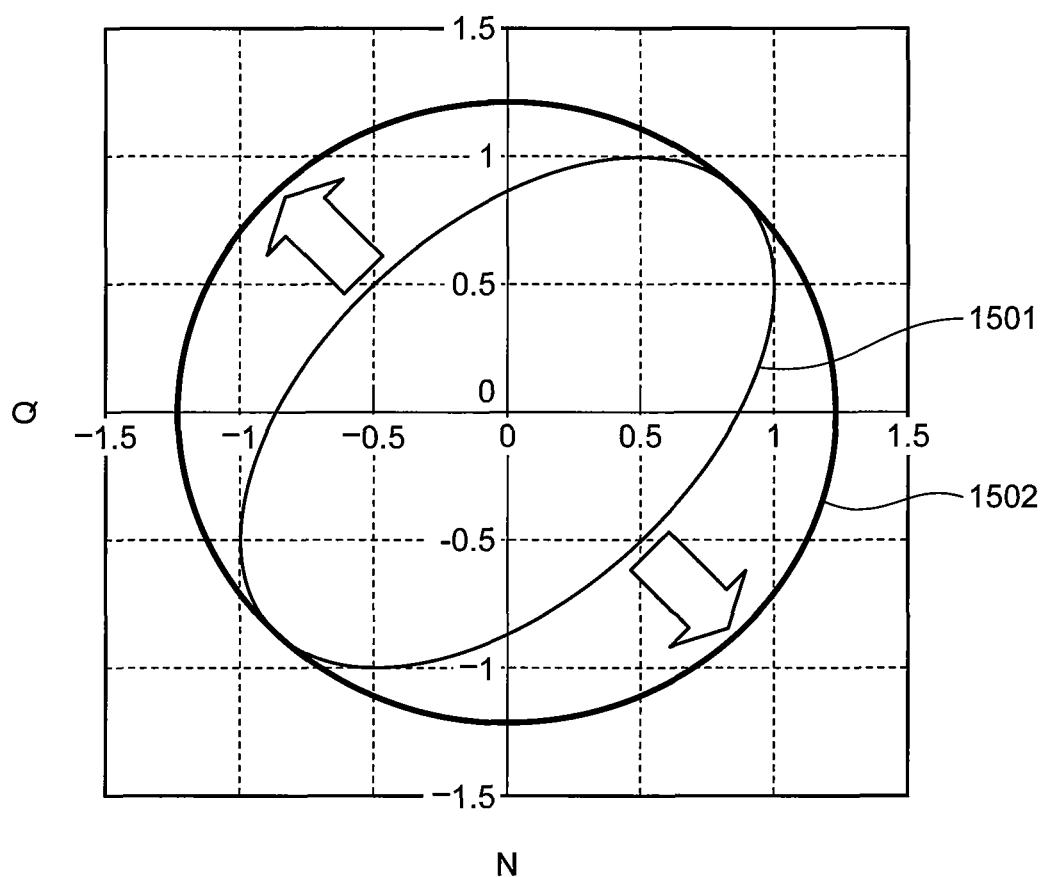
FIG. 15 is an exemplary chart illustrating a concept of correction performed by a velocity correcting module in the first embodiment.

FIG. 15 is a chart illustrating the concept of correction performed by the velocity correcting module 311. As illustrated in FIG. 15, the velocity correcting module 311 performs a correction by amplifying a trace 1501 of a position Lissajous figure depressed owing to the magnetic head 122 having a moving velocity in a direction of an axis rotated by +45 degrees or an axis rotated by −45 degrees from coordinate axes so as to make the trace of the position Lissajous figure form a circle 1502.

Figure 16:
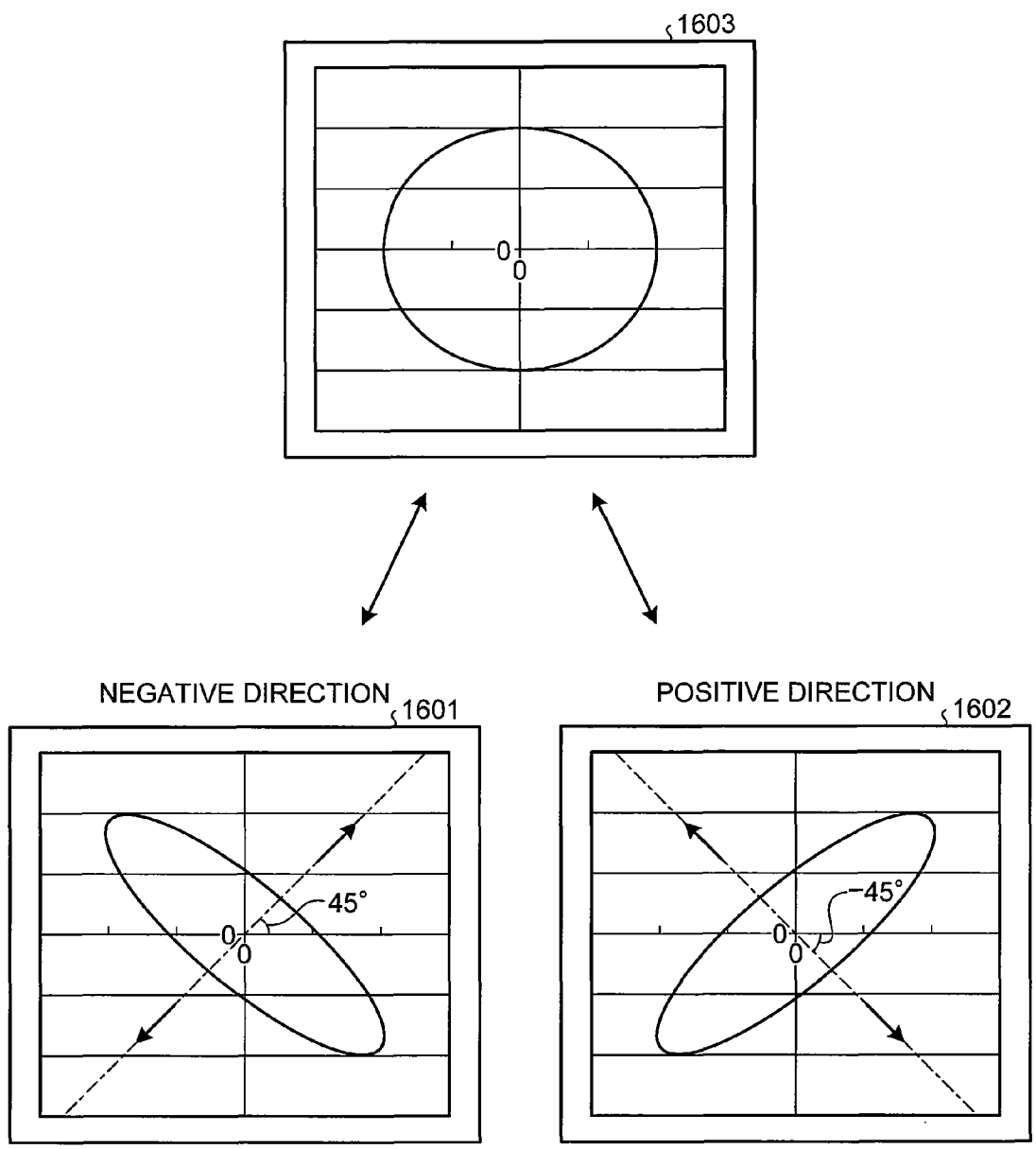
FIG. 16 is a group of exemplary charts illustrating a concept of correction performed by the velocity correcting module based on a moving direction of the magnetic head in the first embodiment.

Whether to rotate +45 degrees or to rotate −45 degrees is differentiated by the moving direction of the magnetic head 122. FIG. 16 is a group of charts illustrating the concept of correction based on the moving direction of the magnetic head 122 in the velocity correcting module 311. A chart 1601 in FIG. 16 illustrates a position Lissajous figure that is formed elliptical due to the magnetic head 122 seeking in the negative direction. A chart 1602 illustrates a position Lissajous figure that is formed elliptical due to the magnetic head 122 seeking in the positive direction. The velocity correcting module 311 performs a different correction corresponding to the negative direction or the positive direction so as to correct the position Lissajous figure to be in a circular shape as illustrated in a chart 1603.

Accordingly, the velocity correcting module 311 corrects the vector components on either axis of the X-coordinate axis being rotated by +45 degrees with reference to an origin or the X-coordinate axis being rotated by −45 degrees with reference to the origin based on the moving direction of the magnetic head 122.

As for a specific demodulation algorithm, the velocity correcting module 311 in the present embodiment sets vector components that represent a +45 degree rotated axis as a subject of correction in a seek operation in which the magnetic head 122 moves in the negative direction. Then, the velocity correcting module 311 multiplies a vector representing the demodulation signals N and Q on a phase plane by a rotation matrix that gives a rotation of −45 degrees, then multiplies the vector by an augmented matrix that expands in an X-axis direction for the width represented by a correction coefficient, and finally multiplies the vector by a rotation matrix that gives a rotation of +45 degrees.

The correction coefficient is defined as a coefficient set based on a ratio of a distance to an intersection of the X-coordinate axis with a trace of a position Lissajous figure to a distance to an intersection of the Y-coordinate axis with the trace of the position Lissajous figure after the position Lissajous figure in elliptical shape being rotated by 45 degrees. The correction coefficient, other than being dependent on the moving velocity of the magnetic head 122, also varies by the width of the read core of the magnetic head 122. In the present embodiment, a table of correction coefficients corresponding to the moving velocities is stored in advance in the flash ROM 128. However, it is not restricted that the correction coefficient is used in such a manner, and it is conceivable that, for example, the correction coefficient is actually measured and stored in an examination process in a factory to be used for the velocity correction.

On the other hand, in a seek operation in which the magnetic head 122 moves in the positive direction, the velocity correcting module 311 sets vector components that represent a −45 degree rotated axis as a subject of correction. Then, the velocity correcting module 311 multiplies a vector representing the demodulation signals N and Q on a phase plane by a rotation matrix that gives a rotation of −45 degrees, then multiplies the vector by an augmented matrix that expands in the X-axis direction for the width represented by a correction coefficient, and finally multiplies the vector by a rotation matrix that gives a rotation of +45 degrees.

By these corrections, when a position Lissajous figure is formed in a depressed elliptical shape owing to the magnetic head 122 having a moving velocity, the correction is made to extend the position Lissajous figure in a minor axis direction and to make it form a circular shape. Consequently, because the phase difference between the demodulation signals N and Q is corrected, the position demodulation can be performed more accurately.

Furthermore, the velocity correcting module 311 reads out an appropriate correction coefficient from the flash ROM 128 based on the moving velocity calculated by the velocity calculating module 313 and on the magnetic head 122 to be the subject of position determination. In the present embodiment, there are N+1 (head 0 to head N) pieces of the magnetic heads 122, and the CPU 126 performs the position determination for each piece of the magnetic heads 122.

Figure 17:
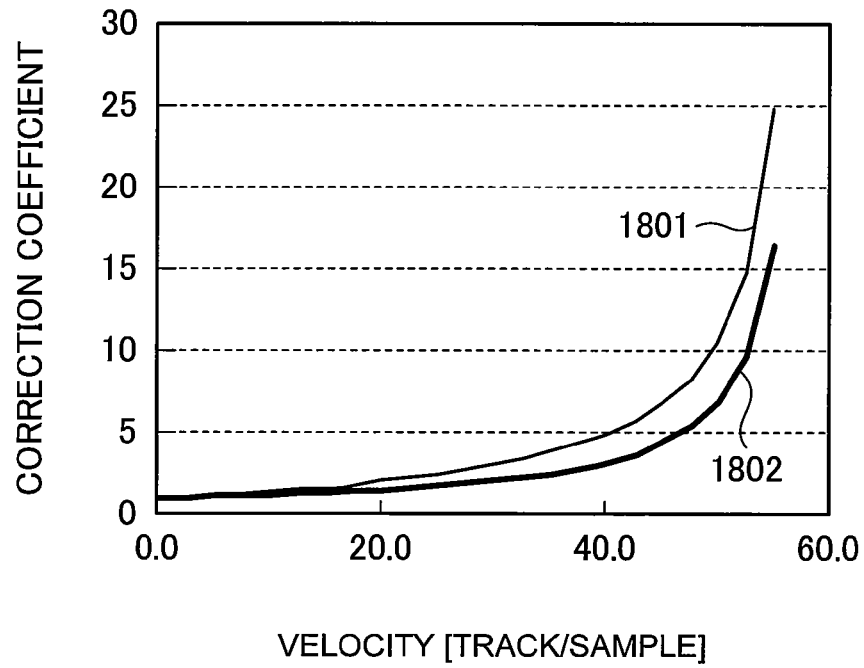
FIG. 17 is an exemplary chart illustrating examples of transition in correction coefficients based on moving velocity.

FIG. 17 is a chart illustrating examples of transition in correction coefficients based on moving velocity. In the correction coefficients illustrated in FIG. 17, a curve 1801 represents the transition in correction coefficient when the core width is 0.5 times the track pitch. Meanwhile, a curve 1802 represents the transition in correction coefficient when the core width is 0.9 times the track pitch. As illustrated in FIG. 17, the correction coefficient differs corresponding to the core width of the magnetic head 122 and the moving velocity of the magnetic head 122. In other words, the correction coefficient is required to select an appropriate value corresponding to, other than the moving velocity of the magnetic head 122, the width of the read core of the magnetic head 122 with respect to the track pitch. Therefore, as in the present embodiment, the table of correction coefficients is embedded in the flash ROM 128. Other than a method to retain the correction coefficients in a table, it is also effective to calculate a velocity correction coefficient for an individual head by actual measurement in an examination process in a factory so as to store and use it.

As illustrated in FIG. 17, the correction coefficient is a coefficient that increases as the moving velocity of the magnetic head 122 increases. Accordingly, that an appropriate correction coefficient is used corresponding to the moving velocity of the magnetic head 122 can appropriately correct a position Lissajous figure depressed corresponding to the moving velocity of the magnetic head 122 into a circular shape. More specifically, the correction coefficient is obtained from a ratio of a major axis to a minor axis (major axis/minor axis) of a position Lissajous figure in a depressed elliptical shape.

The disk storage device 100 comprises a plurality of magnetic heads 122, and the core width differs for each of the magnetic heads 122. Therefore, when determining the position of each of the magnetic heads 122, it is necessary to prepare correction coefficients for each of the magnetic heads 122. Accordingly, in the present embodiment, as illustrated in FIG. 3, the correction coefficients for each of the magnetic heads 122 are stored in the flash ROM 128.

The head position demodulator 312 demodulates a positional signal of the read core of the magnetic head 122 based on the demodulation signals N and Q after being corrected by the velocity correcting module 311. The head position demodulator 312 in the present embodiment receives the demodulation signals N and Q after being corrected, and outputs a phase angle θ indicative of a direction of a vector formed by the demodulation signals N and Q on a phase plane as a signal y indicative of the position of the magnetic head 122. In the head position demodulator 312 in the present embodiment, while a function of either arctan (demodulation signal Q/demodulation signal N) or arctan (demodulation signal N/demodulation signal Q) is used to demodulate, other methods may be used. By this signal, the position of the magnetic head 122 can be determined.

The VCM controller 316 performs an operation control of the motor driver 121 corresponding to a control signal r corrected by the signal y indicative of the position of the magnetic head 122 determined by the head position demodulator 312 to perform the position control of the magnetic head 122.

Figure 18:
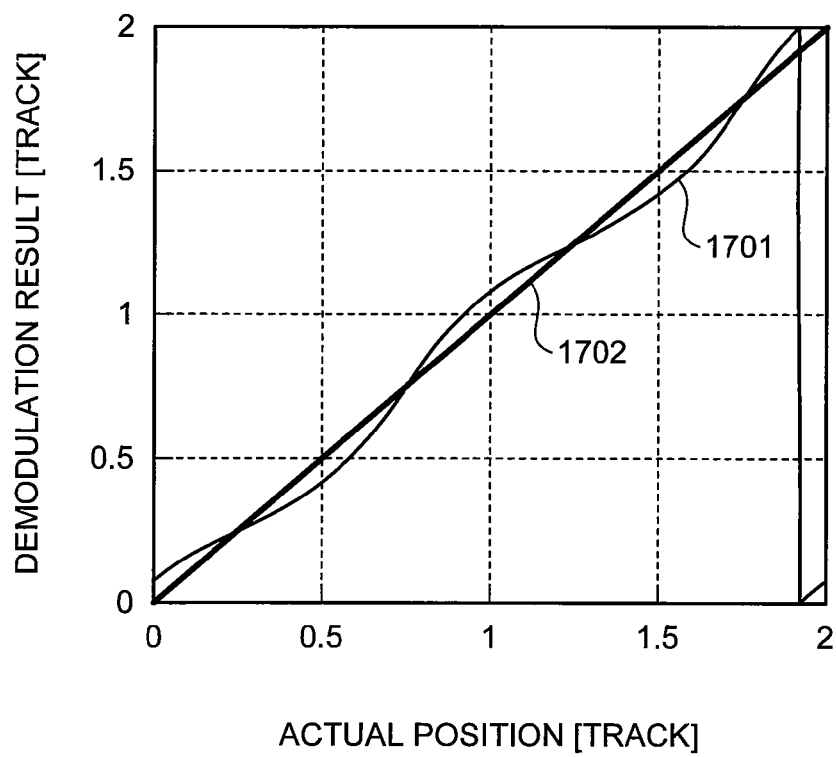
FIG. 18 is an exemplary chart illustrating results of demodulation performed by a head position demodulator in the first embodiment.

FIG. 18 is a chart illustrating the results of demodulation performed by the head position demodulator 312. In the chart illustrated in FIG. 18, the demodulation result of when the correction by the velocity correcting module 311 is not performed provides a curve 1701. As in the curve 1701, when the correction by the velocity correcting module 311 is not performed, the actual position and the demodulation result are non-linear.

In contrast, the demodulation result of when the correction by the velocity correcting module 311 is performed provides a line 1702. As in the line 1702, when the correction is performed by the velocity correcting module 311, compared with that of when the correction is not performed, linearity is maintained. Accordingly, by the velocity correcting module 311 performing the correction, the linearity in determining the position of the magnetic head 122 can be improved. In other words, the determining accuracy of the position of the magnetic head 122 can be improved.

The velocity calculating module 313 calculates a moving velocity of the magnetic head 122 based on the demodulated position of the magnetic head 122, and outputs the moving velocity to the velocity correcting module 311. As for a method of calculating the moving velocity of the magnetic head 122, any methods may be used. For example, the velocity calculating module 313 calculates a moving velocity by subtracting the position of the magnetic head 122 received in a previous round from the position of the magnetic head 122 received this time round to obtain a distance, and then by dividing the distance by a time interval until the position is obtained. Then, corresponding to the moving velocity received, the velocity correcting module 311 can perform the correction using an appropriate correction coefficient.

The correction coefficients stored in the flash ROM 128 are the coefficients calculated and stored therein in advance by the coordinate calculating module 314 and the coefficient calculating module 315. In the present embodiment, while the calculation of correction coefficients is performed before shipping the disk storage device 100, the present embodiment is not intended to restrict the timing of the calculation. When recording the correction coefficients, the disk storage device 100 makes the magnetic head 122 perform a random seek operation.

Referring back to FIG. 3, during a random seek operation of the magnetic head 122, when the demodulation signal N and the demodulation signal Q demodulated by the null demodulator 321 are represented as a vector on a phase plane by assigning the signals to values on respective coordinate axes different from each other, the coordinate calculating module 314 rotates the vector by 45 degrees with reference to an origin. Because of this, an axis in a direction of depressing a position Lissajous figure is assigned to a coordinate axis. In the present embodiment, an axis in a direction of depressing a position Lissajous figure is assigned on an X-coordinate. The coordinate calculating module 314 then calculates, for each moving velocity, a position coordinate indicative of a terminal of a vector after the rotation.

The coefficient calculating module 315 calculates a correction coefficient for each moving velocity based on a ratio of a distance from a position coordinate on an X-coordinate axis to an origin on a phase plane to a distance from a position coordinate on a Y-coordinate axis to the origin, out of the position coordinates for each moving velocity calculated by the coordinate calculating module 314. In the present embodiment, the coefficient calculating module 315 divides the distance from a position coordinate on the Y-coordinate axis to the origin on the phase plane by the distance from a position coordinate on the X-coordinate axis to the origin to calculate the correction coefficient for each moving velocity. The correction coefficient calculated for each moving velocity is then stored in the flash ROM 128. The calculation of correction coefficient for each moving velocity is performed for each of the magnetic heads 122.

Figure 19:
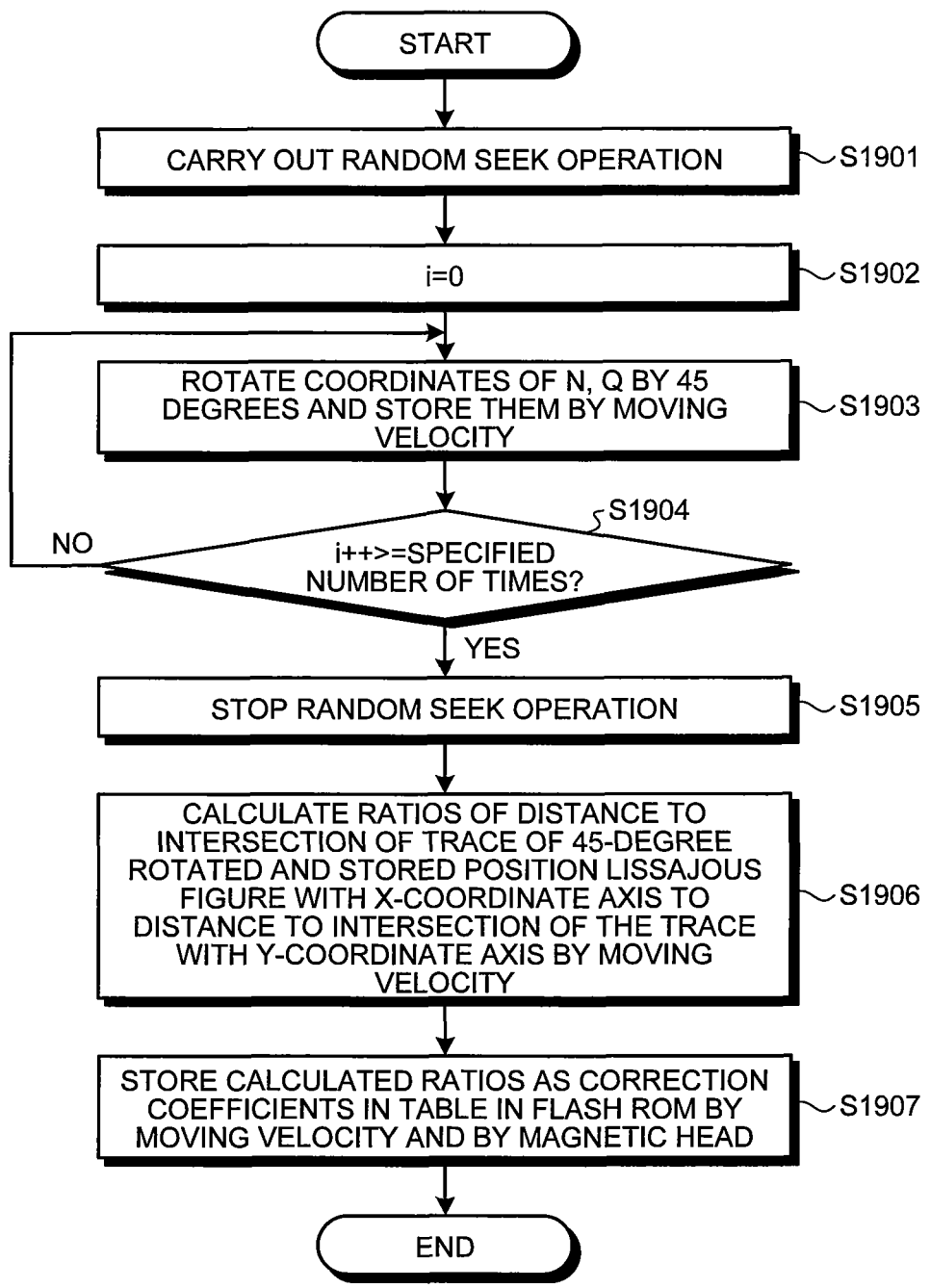
FIG. 19 is an exemplary flowchart illustrating a procedure of process for calculating a correction coefficient in the disk storage device in the first embodiment.

FIG. 19 is an example flowchart illustrating a procedure of process for calculating the correction coefficients. As illustrated in FIG. 19, when calculating the correction coefficients in the disk storage device 100, the CPU 126 controls to execute a random seek operation of the magnetic head 122 (S1901). By the random seek operation, a plurality of demodulation signal samples at moving velocities different from one another can be obtained.

The CPU 126 then sets an initial value of 0 to a variable i (S1902). Thereafter, the coordinate calculating module 314 rotates by 45 degrees the coordinate of the terminal of a vector that is the demodulation signals N and Q demodulated by the null demodulator 321 assigned to the respective coordinate axes during the random seek operation, and then stores the coordinate in the buffer RAM 129 by moving velocity (S1903). By repeating this process, a position Lissajous figure that is drawn by the terminals of the respective vectors is stored in the buffer RAM 129 by moving velocity.

The CPU 126 then adds 1 to the variable i and determines whether the variable i is of a specified number of times or more (S1904). When it is under the specified number of times (No at S1904), the process at S1903 is repeated.

In contrast, when it is of the specified number of times or more (Yes at S1904), the CPU 126 controls to stop the random seek operation by the magnetic head 122 (S1905).

Then, the coefficient calculating module 315 calculates the ratios, by moving velocity, of a distance of intersections of the trace of the position Lissajous figure drawn by the terminals of the respective vectors that have been rotated and stored in the buffer RAM 129 with an X-coordinate axis to a distance of intersections of the trace with a Y-coordinate axis (S1906).

The coefficient calculating module 315 then stores the calculated ratios as the correction coefficients in the table in the flash ROM 128 by moving velocity and by the magnetic head 122 (S1907), and the process is finished.

In other words, while the velocity correction values are necessary to be calculated for respective moving velocities, in the present embodiment, the magnetic head 122 is moved at various velocities by executing a random seek operation. Then, the demodulation signals N and Q after being tilted by 45 degrees are stored by moving velocity in the flash ROM 128. The buffer RAM 129 then stores therein position Lissajous figures by moving velocity drawn by the terminals of vectors represented by the demodulation signals N and Q. Then, the coefficient calculating module 315 can calculate the correction coefficients at all moving velocities for each of the magnetic heads 122 from the respective position Lissajous figures by moving velocity.

Figure 20:
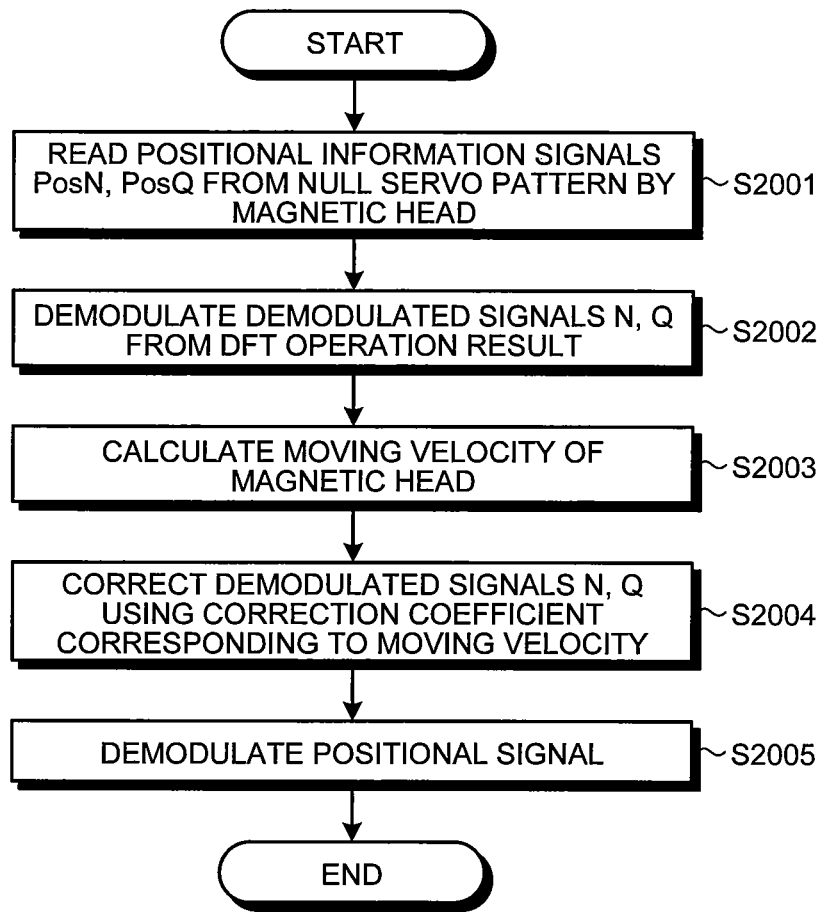
FIG. 20 is an exemplary flowchart illustrating a procedure of process for determining the position of the magnetic head in the disk storage device in the first embodiment.

A process to determine the position of the magnetic head 122 in the disk storage device 100 in the present embodiment will be described. FIG. 20 is a flowchart illustrating a procedure of the above-described process in the disk storage device 100 in the present embodiment.

The read core of the magnetic head 122 first reads out the positional information signals PosN and PosQ from a null servo pattern (S2001).

The null demodulator 321 then performs a DFT (discrete Fourier transform) operation on the positional information signals PosN and PosQ to demodulate the demodulation signals N and Q (S2002).

Thereafter, the velocity calculating module 313 calculates a moving velocity of the magnetic head 122 based on the magnetic head 122 demodulated at a previous round and such (S2003). As for a method for calculating a moving velocity, varieties of conventional methods have been proposed and therefore, its explanation is omitted.

The velocity correcting module 311 then performs the correction on the demodulation signals N and Q using a correction coefficient corresponding to the moving velocity calculated at S2003 and to the magnetic head 122 (S2004). When performing the correction, the velocity correcting module 311 rotates by 45 degrees (or −45 degrees) the vector that is represented by assigning the demodulation signals N and Q on the respective coordinate axes, then multiplies the vector by an augmented matrix that expands by the correction coefficient, and finally rotates the vector by −45 degrees (or 45 degrees).

Thereafter, the head position demodulator 312 demodulates a positional signal indicative of the read core of the magnetic head 122 based on the corrected demodulation signals N and Q (S2005).

By the above-described processing procedure, in the disk storage device 100 in the present embodiment, the positional signal is demodulated after the correction corresponding to the moving velocity of the magnetic head 122 is performed.

Second Embodiment

In the first embodiment, exemplified is a situation in which the basic waveform of a position Lissajous figure is a circle. However, the basic waveform of a position Lissajous figure to be a subject of the correction is not restricted to a circle. In a second embodiment, exemplified will be a situation in which, because of the detection sensitivity of the magnetic head 122 being different from that of the first embodiment, the basic waveform of a position Lissajous figure is different from that of the first embodiment. The configuration of the disk storage device 100 is the same as that of the first embodiment and thus, the explanation thereof is omitted.

Figure 21:
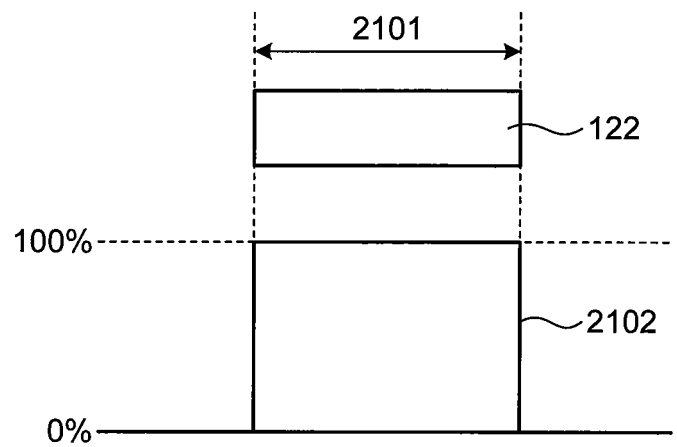
FIG. 21 is an exemplary chart illustrating detection sensitivity of a magnetic head according to a second embodiment.

FIG. 21 is a chart illustrating detection sensitivity of the magnetic head 122 in the second embodiment. In the present embodiment, as illustrated in FIG. 21, a line 2102 having a shape like a rectangular pulse whose width of 100% detection sensitivity is the same as a core width 2101 of the magnetic head 122 is drawn. In the line 2102, the detection sensitivity changes from 100% to 0% at both ends of the core width.

Figure 22:
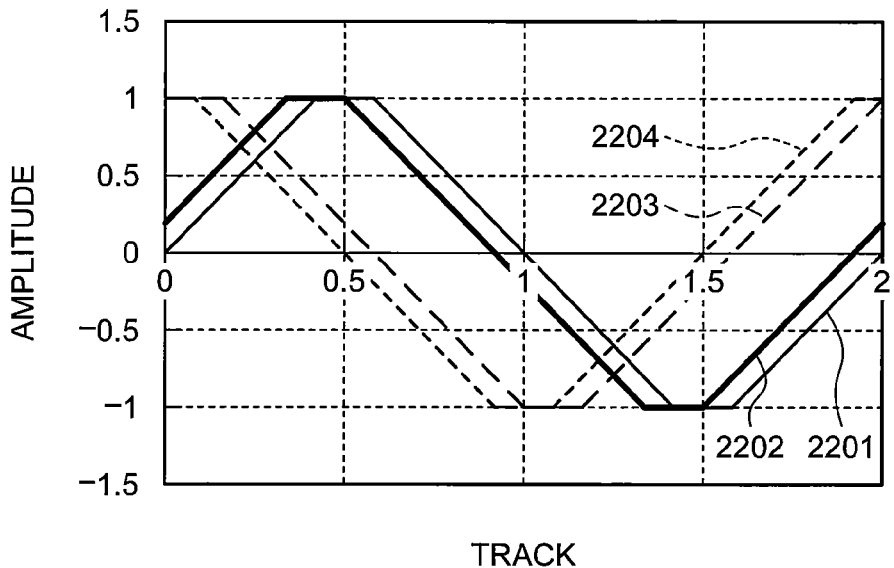
FIG. 22 is an exemplary chart depicting traces of the demodulation signal N and the demodulation signal Q when the magnetic head in a disk storage device has and does not have a moving velocity in the second embodiment.

FIG. 22 is a chart depicting traces of the demodulation signal N and the demodulation signal Q when the magnetic head 122 has and does not have a moving velocity, in the disk storage device 100 in the second embodiment. A trace 2201 represents the trace of the demodulation signal N when the magnetic head 122 does not have a moving velocity. A trace 2204 represents the trace of the demodulation signal Q when the magnetic head 122 does not have a moving velocity. When the detection sensitivity of the magnetic head 122 draws a line as illustrated in FIG. 21, the traces of the demodulation signal N and the demodulation signal Q also become straight lines as illustrated in FIG. 22.

When the magnetic head 122 has a moving velocity in the positive direction, the demodulation signal N draws a trace 2202 and the demodulation signal Q draws a trace 2203. As illustrated in FIG. 22, the demodulation signal N and the demodulation signal Q change in phase when the magnetic head 122 has a moving velocity. As illustrated in FIG. 22, when the magnetic head 122 has a moving velocity in the positive direction, the demodulation signal N and the demodulation signal Q change in phase such that the width between the traces thereof becomes narrower. Meanwhile, although it is not illustrated in FIG. 22, when the magnetic head 122 has a moving velocity in the negative direction, the demodulation signal N and the demodulation signal Q change in phase such that the width between the traces thereof becomes wider. The greater the moving velocity is, the wider the width of the change in phase becomes.

Figure 23:
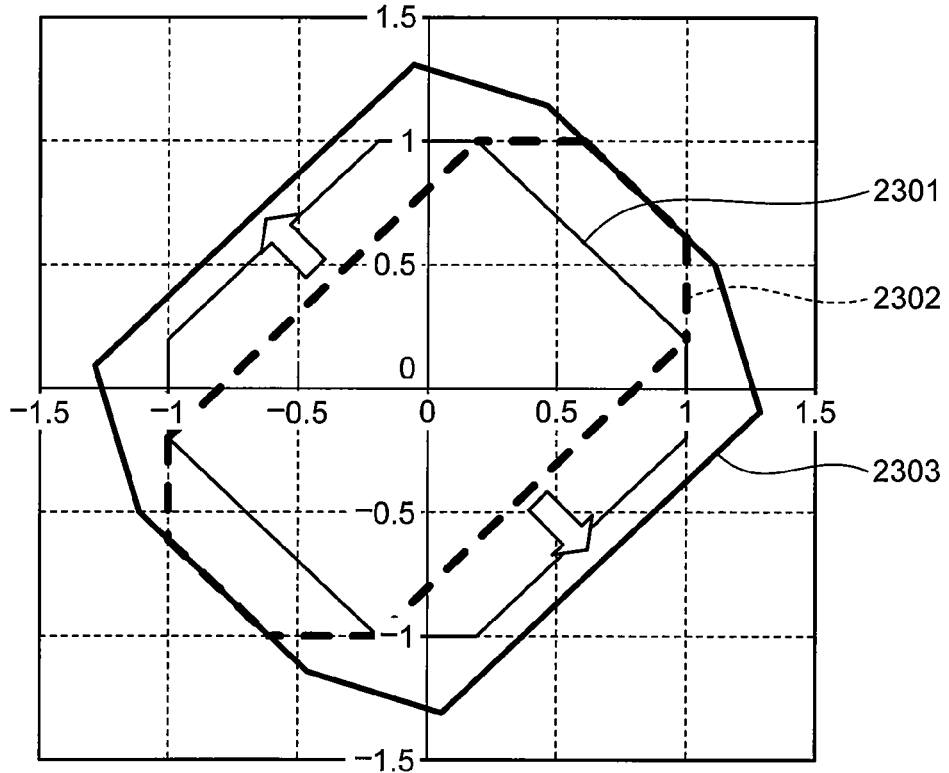
FIG. 23 is an exemplary chart for explaining position Lissajous figures drawn when the magnetic head in the disk storage device has and does not have a moving velocity, and when the velocity is corrected by the velocity correcting module in the second embodiment.

FIG. 23 is a chart for explaining a position Lissajous figure drawn when the magnetic head 122 has and does not have a moving velocity, and when the velocity is corrected by the velocity correcting module 311. As illustrated in FIG. 23, when the magnetic head 122 does not have a moving velocity, an octagonal position Lissajous figure 2301 is drawn. Meanwhile, when the magnetic head 122 has a moving velocity, compared with when not having a moving velocity, drawn is an octagonal position Lissajous figure 2302 depressed in a direction of an axis rotated by −45 degrees from an X-coordinate axis with reference to an origin. After the demodulation signal N and the demodulation signal Q are corrected by the velocity correcting module 311, because the Lissajous figure is expanded in a direction of the axis rotated by −45 degrees from the X-coordinate axis with reference to the origin, a trace 2303 is drawn. The correction method is the same as that of the first embodiment and thus, its explanation is omitted.

Figure 24:
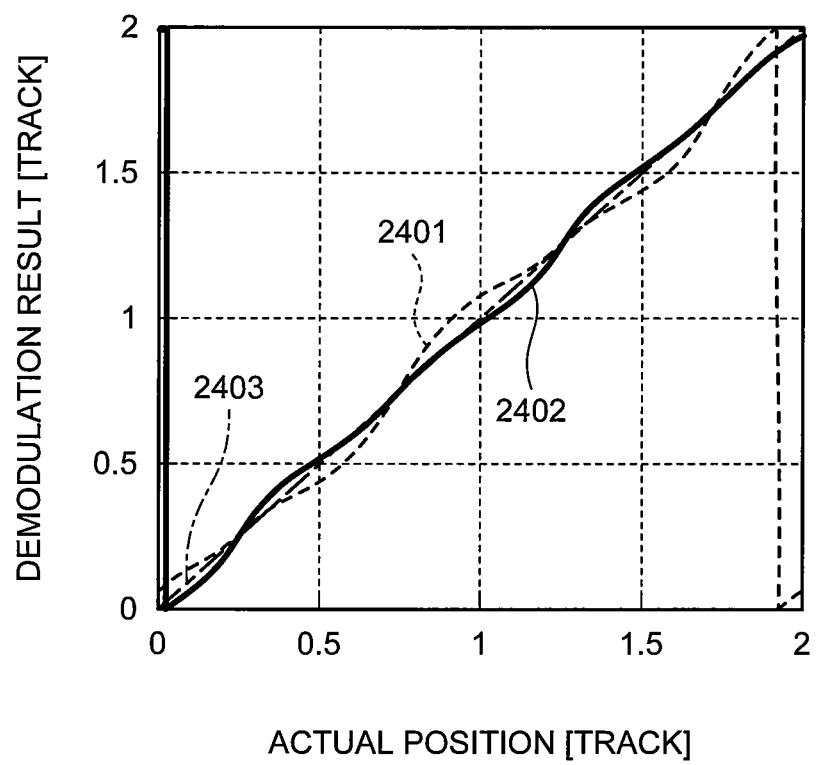
FIG. 24 is an exemplary chart illustrating results of demodulation performed by a head position demodulator in the second embodiment.

The head position demodulator 312 demodulates a positional signal of the read core of the magnetic head 122 based on the demodulation signals N and Q after being corrected by the velocity correcting module 311. FIG. 24 is a chart illustrating the results of demodulation performed by the head position demodulator 312. In the chart illustrated in FIG. 24, a curve 2401 represents the demodulation result of when the correction by the velocity correcting module 311 is not performed.

In contrast, the demodulation results of when the magnetic head 122 does not have a moving velocity and when the correction by the velocity correcting module 311 is performed are represented as a curve 2402 being overlapped. In other words, when the correction is performed by the velocity correcting module 311, a demodulation result similar to that of when the magnetic head 122 does not have a moving velocity can be obtained. Furthermore, because the curve 2402 indicates values closer to a straight line 2403 than the curve 2401, compared with the curve 2401, the curve 2402 has a higher linearity. Consequently, that the velocity correcting module 311 performs the correction allows, compared with when the correction is not performed, improving the linearity in determining the position of the magnetic head 122. In other words, the determining accuracy of the position of the magnetic head 122 can be improved.

As exemplified in the present embodiment, even when a position Lissajous figure is octagonal, by performing the correction based on the moving velocity of the magnetic head 122, the determining accuracy of positions can be improved. Moreover, even when the shape of a position Lissajous figure is other than a circular or an octagonal shape, performing the correction exemplified in the first embodiment and the second embodiment can achieve a similar effect.

MODIFICATION EXAMPLES

In the above-described embodiments, a null servo pattern has been exemplified as the servo pattern. However, the servo pattern is not restricted to a null servo pattern, and even an area servo pattern, for example, can provide a similar effect.

In the foregoing embodiments, the positional information signals PosN and PosQ are obtained from the null servo pattern in two phases. In contrast, with positional information signals PosA, PosB, PosC, and PosD obtainable from an area servo pattern in four phases, it is equivalent to PosN=PosA−

PosB and PosQ=PosC−PosD. Consequently, even with an area servo pattern, the above-described processes can be applied to.

In the present embodiments, while the velocity correction of the magnetic head 122 has been performed, other correction methods may be combined with. In accordance with the disk storage device 100 in the present embodiments, performing the correction of the demodulation signals N and Q using any one or more of the above-described correction methods allows improving the determining accuracy of the position of the magnetic head 122.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position demodulation apparatus comprising:
   a demodulator configured to demodulate a first demodulation signal and a second demodulation signal having a phase difference of 90 degrees to the first demodulation signal based on a read-out signal obtained by reading out a servo pattern recorded on a medium by the head for positioning of a head with respect to the medium;
   a correcting module configured to perform on the first demodulation signal and the second demodulation signal a correction in which, when a trace of a Lissajous figure is drawn representing the first demodulation signal and the second demodulation signal as values on coordinate axes different from each other on a plane, a ratio of respective lengths between intersections of the trace intersecting with two axes orthogonal at an origin of the plane and different from the coordinate axes is kept constant; and
   a position demodulator configured to demodulate a positional signal for determining a position of the head based on the first demodulation signal and the second demodulation signal after being corrected by the correcting module.

2. The position demodulation apparatus of claim 1, wherein the correcting module is configured to perform on the first demodulation signal and the second demodulation signal a correction in which a ratio of a length between intersections of the trace intersecting with a first axis obtained by rotating a coordinate axis by 45 degrees with reference to the origin of the plane to a length between intersections of the trace intersecting with a second axis that is orthogonal to the first axis at the origin is kept constant.

3. The position demodulation apparatus of claim 2, wherein the correcting module is configured to perform the correction based on an axis obtained by rotating a coordinate axis by 45 degrees with reference to the origin or an axis obtained by rotating the coordinate axis by −45 degrees with reference to the origin based on a moving direction of the head.

4. The position demodulation apparatus of claim 1, wherein the correcting module is configured to increase a correction coefficient to correct the first demodulation signal and the second demodulation signal as a moving velocity of the head increases.

5. The position demodulation apparatus of claim 4, further comprising:
   a coordinate calculating module configured, when the first demodulation signal and the second demodulation signal which are demodulated are represented as a vector by assigning the first demodulation signal and the second demodulation signal on coordinate axes different from each other on the plane, to rotate the vector by 45 degrees with reference to the origin and to calculate by velocity a position coordinate of a terminal of the vector after being rotated; and
   a coefficient calculating module configured to calculate correction coefficients by velocity based on a ratio of a distance from a position coordinate on a first coordinate axis to the origin on the plane to a distance from a position coordinate on a second coordinate axis obtained by rotating the first coordinate axis by 90 degrees to the origin out of the position coordinates calculated by velocity by the coordinate calculating module.

6. The position demodulation apparatus of claim 5, wherein calculation of the position coordinates by velocity by the coordinate calculating module and calculation of the correction coefficients by velocity by the coefficient calculating module are performed for each of a plurality of heads.

7. A position demodulation apparatus comprising:
   a demodulator configured to demodulate a first demodulation signal and a second demodulation signal having a phase difference of 90 degrees to the first demodulation signal based on a read-out signal obtained by reading out a servo pattern recorded on a medium by the head for positioning of a head with respect to the medium;
   a correcting module configured to perform, on the first demodulation signal and the second demodulation signal, a correction on an axis tilted by 45 degrees from respective coordinate axes on a plane representing the first demodulation signal as values on one of the coordinate axes and the second demodulation signal as values on the other of the coordinate axes; and
   a position demodulator configured to demodulate a positional signal for determining a position of the head based on the first demodulation signal and the second demodulation signal after being corrected by the correcting module.

8. The position demodulation apparatus of claim 7, wherein the correcting module is configured to perform the correction based on an axis obtained by rotating a coordinate axis by 45 degrees with reference to the origin or an axis obtained by rotating the coordinate axis by −45 degrees with reference to the origin based on a moving direction of the head.

9. The position demodulation apparatus of claim 7, wherein the correcting module is configured to increase a correction coefficient to correct the first demodulation signal and the second demodulation signal as a moving velocity of the head increases.

10. The position demodulation apparatus of claim 9, further comprising:
    a coordinate calculating module configured, when the first demodulation signal and the second demodulation signal which are demodulated are represented as a vector by assigning the first demodulation signal and the second demodulation signal on coordinate axes different from each other on the plane, to rotate the vector by 45 degrees with reference to the origin and to calculate by velocity a position coordinate of a terminal of the vector after being rotated; and a coefficient calculating module configured to calculate correction coefficients by velocity based on a ratio of a distance from a position coordinate on a first coordinate axis to the origin on the plane to a distance from a position coordinate on a second coordinate axis obtained by rotating the first coordinate axis by 90 degrees to the origin out of the position coordinates calculated by velocity by the coordinate calculating module.

11. The position demodulation apparatus of claim 10, wherein calculation of the position coordinates by velocity by the coordinate calculating module and calculation of the correction coefficients by velocity by the coefficient calculating module are performed for each of a plurality of heads.

12. A position demodulation method of a position demodulation apparatus comprising:

demodulating, by a demodulator, a first demodulation signal and a second demodulation signal having a phase difference of 90 degrees to the first demodulation signal based on a read-out signal obtained by reading out a servo pattern recorded on a medium by the head for positioning of a head with respect to the medium;

correcting, by a correcting module, the first demodulation signal and the second demodulation signal in which, when a trace of a Lissajous figure is drawn representing the first demodulation signal and the second demodulation signal as values on coordinate axes different from each other on a plane, a ratio of respective lengths between intersections of the trace intersecting with two axes orthogonal at an origin of the plane and different from the coordinate axes is kept constant; and demodulating, by a position demodulator, a positional signal for determining a position of the head based on the first demodulation signal and the second demodulation signal after being corrected at the correcting.

13. The position demodulation method of claim 12, wherein the correcting comprises performing on the first demodulation signal and the second demodulation signal a correction in which a ratio of a length between intersections of the trace intersecting with a first axis obtained by rotating a coordinate axis by 45 degrees with reference to the origin of the plane to a length between intersections of the trace intersecting with a second axis that is orthogonal to the first axis at the origin is kept constant.

* * * * *